(12) United States Patent
Bakre et al.

(10) Patent No.: US 8,008,873 B2
(45) Date of Patent: Aug. 30, 2011

(54) RESTART CIRCUIT FOR MULTIPLE LAMP ELECTRONIC BALLAST

(75) Inventors: Shashank Bakre, Woburn, MA (US); Nitin Kumar, Burlington, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 334 days.

(21) Appl. No.: 12/474,141

(22) Filed: May 28, 2009

(65) Prior Publication Data

US 2010/0301759 A1 Dec. 2, 2010

(51) Int. Cl.
*H05B 37/02* (2006.01)

(52) U.S. Cl. ........ 315/308; 315/224; 315/247; 315/291; 315/225

(58) Field of Classification Search ............ 315/224, 315/225, 247, 291, 294, 307–309, 209 R, 315/185 R
See application file for complete search history.

(56) References Cited

U.S. PATENT DOCUMENTS

| | | | |
|---|---|---|---|
| 5,808,422 A * | 9/1998 | Venkitasubrahmanian et al. | 315/225 |
| 6,011,358 A * | 1/2000 | Knobloch et al. | 315/224 |
| 6,043,612 A * | 3/2000 | Knobloch et al. | 315/224 |
| 6,326,740 B1 * | 12/2001 | Chang et al. | 315/291 |
| 2006/0170372 A1 | 8/2006 | Heckmann et al. | |
| 2006/0232224 A1 | 10/2006 | Heckmann et al. | |
| 2009/0243508 A1 * | 10/2009 | Zhong et al. | 315/291 |

* cited by examiner

*Primary Examiner* — Douglas W Owens
*Assistant Examiner* — Amy Yang
(74) *Attorney, Agent, or Firm* — Shaun P. Montana

(57) ABSTRACT

A restart circuit for causing an electronic ballast to perform a restart in response to reconnecting any lamp of a multiple lamp configuration of the electronic ballast to the electronic ballast is disclosed. The electronic ballast includes a filament health check circuit for providing a first current through a monitored filament of the lamps to a controller of the ballast. The controller restarts the electronic ballast when a determined ratio of the first current to a reference current indicates that the monitored filament has been disconnected or broken (i.e., the first current substantially decreases) and is subsequently replaced or reconnected to the ballast (i.e., the first current returns to a predetermined level). The ballast further comprises a dv/dt circuit for reducing the first current for a transient time period in response to reconnecting a filament other than the monitored filament to the ballast, causing the controller to restart the ballast.

15 Claims, 5 Drawing Sheets

RESTART CIRCUIT FOR MULTIPLE LAMP ELECTRONIC BALLAST

CROSS REFERENCE TO RELATED APPLICATIONS

Co-invented and co-owned U.S. patent application Ser. No. 12/474,049, filed simultaneously herewith, entitled "Electronic Ballast Control Circuit," is incorporated herein by reference in its entirety. In addition, co-invented and co-owned U.S. patent application Ser. No. 12/474,080, filed simultaneously herewith, entitled "Resetting An Electronic Ballast In The Event Of Fault," is incorporated herein by reference in its entirety.

FIELD OF THE INVENTION

The present invention generally relates to electronic ballasts for providing power to a pair of lamps. More particularly, the invention is concerned with causing the ballast to restart in response to replacing either of the lamps.

BACKGROUND OF THE INVENTION

Ballasts for powering two fluorescent lamps simultaneously start the lamps when power is received from a power supply such as a household power switch (i.e., 120V AC). Starting the ballast includes checking for fault conditions and, upon finding no faults, driving a switching operation of an inverter of the ballast to provide power to the lamps via a resonant circuit of the ballast. When a lamp is disconnected from the ballast or a fault occurs with one of the lamps (e.g., a filament breaks or becomes nonconductive), the ballast prevents the inverter from performing the switching operation. That is, the inverter is shut down. The inverter remains shut down until the power to the ballast from the power supply is disconnected and subsequently reconnected, or until a monitored filament of the two lamps is disconnected from the ballast and subsequently reconnected, causing a restart (i.e., relamping) of the ballast. For example, if a user removes and replaces the lamp having the monitored filament, the ballast automatically restarts when the lamp is reconnected to the ballast (e.g., reinserted into a fixture containing the ballast). If the user instead removes and replaces the other lamp, not having the monitored filament, the ballast shuts off when the lamp is removed, and remains off even after the lamp is reconnected to the ballast. The user must remove and replace the lamp having the monitored filament, or cycle the power to the ballast (i.e., turn the power to the ballast off and back on) in order to restart the ballast.

SUMMARY OF THE INVENTION

Aspects of the invention include an electronic ballast and method for causing a restart (i.e., relamping) of the ballast in response to a user replacing either of a first lamp or a second lamp powered by the ballast. The ballast includes a controller, an inverter, a resonant circuit, a filament health check circuit, and a dv/dt (voltage rate of change or voltage slope) circuit. The controller compares a first current, representative of a current through a second filament of the second lamp, to a second current, wherein the second current is a reference current. If a determined ratio of the first current to the second current is less than or equal to a predetermined ratio, then the controller prevents a switching operation of the inverter. If the determined ratio is greater than the predetermined ratio, then the controller drives the switching operation of the inverter. The controller restarts the ballast in response to the determined ratio transitioning from below the predetermined ratio to equal to or above the predetermined ratio. The dv/dt circuit reduces the first current for a transient time period in response to a disturbance of a direct current (DC) component of a current through a second filament of the first lamp, causing the ballast to relamp or restart when either of the first lamp or the second lamp is reconnected to the ballast. The determined ratio may be the ratio of the second current to the first current. Additionally, or alternatively, the controller may prevent the switching operation of the inverter if the determined ratio is greater than a predetermined ratio, and drive the switching operation of the inverter if the determined ratio is less than the predetermined ratio, without deviating from the scope of the invention.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
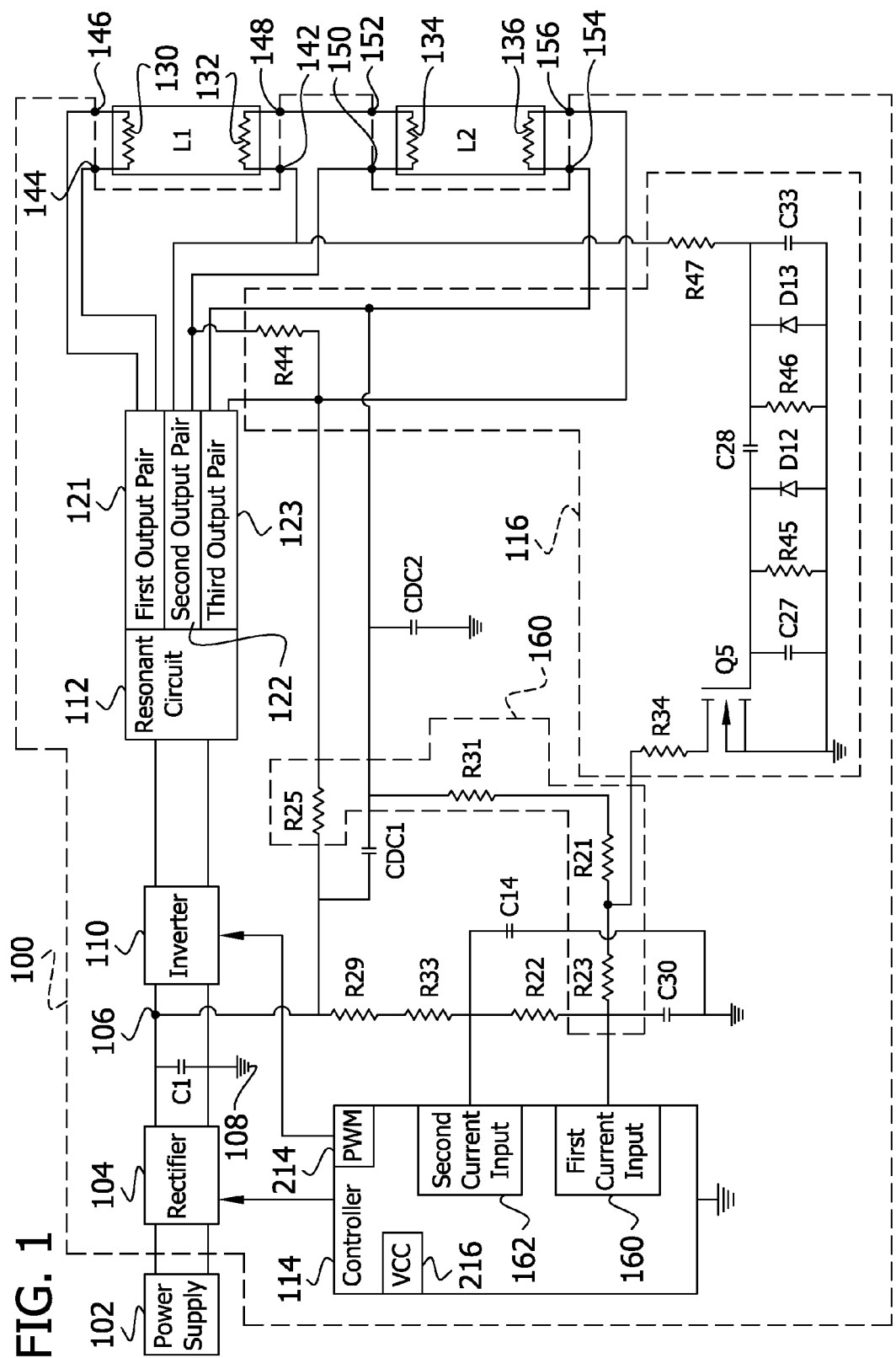
FIG. 1 is a schematic diagram, partially in block form, of an electronic ballast to power a lamp according to one embodiment of the invention.

Referring to FIG. 1, an electronic ballast 100 receives AC power from an alternating current (AC) power supply 102 (e.g., standard 120V AC household power). The ballast 100 comprises a rectifier 104, an inverter 110, a resonant circuit 112, a controller 114, a dv/dt (voltage rate of change or voltage slope) circuit 116, a filament health check circuit 160, and miscellaneous resistors, capacitors, and terminals. The rectifier 104 converts the AC power, received from the AC power supply 102, to direct current (DC) power. Various optional components may be connected to or internal to the rectifier 104 for conditioning and/or altering the DC voltage output of the rectifier 104. These include, but are not limited to, a bus capacitor (shown as element C1 in FIG. 1), a voltage regulator (not shown), a voltage limiter (not shown), a power factor correction circuit (not shown), and a DC-to-DC converter (not shown). The rectifier 104 outputs a DC voltage on a DC voltage bus 106 and a ground 108 for the ballast 100. The optional capacitor C1, connected between the DC voltage bus 106 and the ground 108, conditions the DC voltage transmitted via the DC voltage bus 106. The inverter 110 is connected to the DC voltage bus 106 and the ground 108. When driven by the controller 114, the inverter 110 provides an AC output to the resonant circuit 112. In some embodiments, the inverter may be a half bridge inverter.

During steady state operation, the controller 114 drives a switching operation of the inverter 110 by using a pulse width modulation unit 214, which is part of the controller 114. The controller 114 driving the switching operation of the inverter 110 results in the inverter 110 providing power to the resonant circuit 112. The resonant circuit 112, in turn, uses the provided power to power a first lamp L1 and a second lamp L2. Each of the lamps L1, L2 includes a first filament and a second filament, and each of the filaments includes a first terminal and a second terminal. The resonant circuit includes a first output pair 121, a second output pair 122, and a third output pair 123. In some embodiments, the resonant circuit may include a resonant inductor (e.g., inductor L4-A shown in FIG. 3) and a resonant capacitor (e.g., capacitor C16 shown in FIG. 3).

The output pairs of the resonant circuit 114 are connected to the lamps L1, L2 as follows. The first output pair 121 is connected across a first filament 130 of the first lamp L1. That is, the first output pair 121 is connected to the first terminal 144 and the second terminal 146 of the first filament 130 of the first lamp L1. The second output pair 122 is connected to the second terminal 142 of the second filament 132 of the first lamp L1 and to the first terminal 150 of the first filament 134 of the second lamp L2. The ballast 100 also connects the first terminal 148 of the second filament 132 of the first lamp L1 to the second terminal 152 of the first filament 134 of the second lamp L2. The third output pair 123 is connected across the second filament 136 of the second lamp L2. That is, the third output pair 123 is connected to the first terminal 156 of the second filament 136 of the second lamp, and to the second terminal 154 of the second filament of the second lamp. Each of the first output pair 121, second output pair 122, and third output pair 123 has a first terminal and a second terminal for connecting to the corresponding first or second terminals of the lamps L1, L2, such that the terminals 144, 146, 142, 148, 150, 152, 154, and 156 can be referred to as the terminals of the output pairs or of the filaments.

The controller 114 prevents the switching operation of the inverter 110 if the controller determines that the second filament 136 of the second lamp L2 is not electrically conductive. For example, the second lamp L2 may be broken, not intact, or may otherwise be disconnected from the third output pair 123. A filament health check circuit 160 is for detecting a fault in the second filament 136 of the second lamp L2. The filament health check circuit 160 includes a resistance R25. The filament health check circuit 160 provides the first current to the controller 114 when the second filament 136 of the second lamp L2 is connected to the third output pair 123 regardless of whether the other filaments are connected to the other output pairs. In the electronic ballast 100 shown in FIG. 1, the filament health check circuit also includes resistors R31, R21, and R23. The resistance R25 is connected between the DC voltage bus 106 and the first terminal 156 of the third output pair 123. The second terminal 154 of the third output pair 123 is connected to the first current input 160 of the controller 114 via resistors R31, R21, and R23. Thus, the first current is at least in part representative of a DC current from the DC bus to the controller through the second filament 136 of the second lamp L2. A resistive network comprising resistors R29, R33, and R22 provides a reference current to a second current input 162 of the controller 114. Thus, the reference current may herein be referred to interchangeably as the second current. The controller 114 compares the first current to the second current and determines a ratio of the first current to the second current. If the determined ratio is less than or equal to a predetermined ratio, the controller 114 prevents the switching operation of the inverter 110. That is, the controller 114 prevents the inverter 110 from powering the resonant circuit 112 and the lamps L1 and L2. If the determined ratio is more than the predetermined ratio, the controller 114 drives the switching operation of the inverter 110 to provide power to the resonant circuit 112 and the lamps L1 and L2. In some embodiments, the predetermined ratio may be 3/4. When the determined ratio, as determined by the controller 114, transitions from below the predetermined ratio to the predetermined ratio, the controller 114 checks the electronic ballast 100 and the lamps L1 and L2 for faults. Faults may include, but not limited to, end of lamp life, filaments not intact, and rectifier effect. The controller 114 restarts the electronic ballast 100 if the controller 114 finds no faults.

Figure 2:
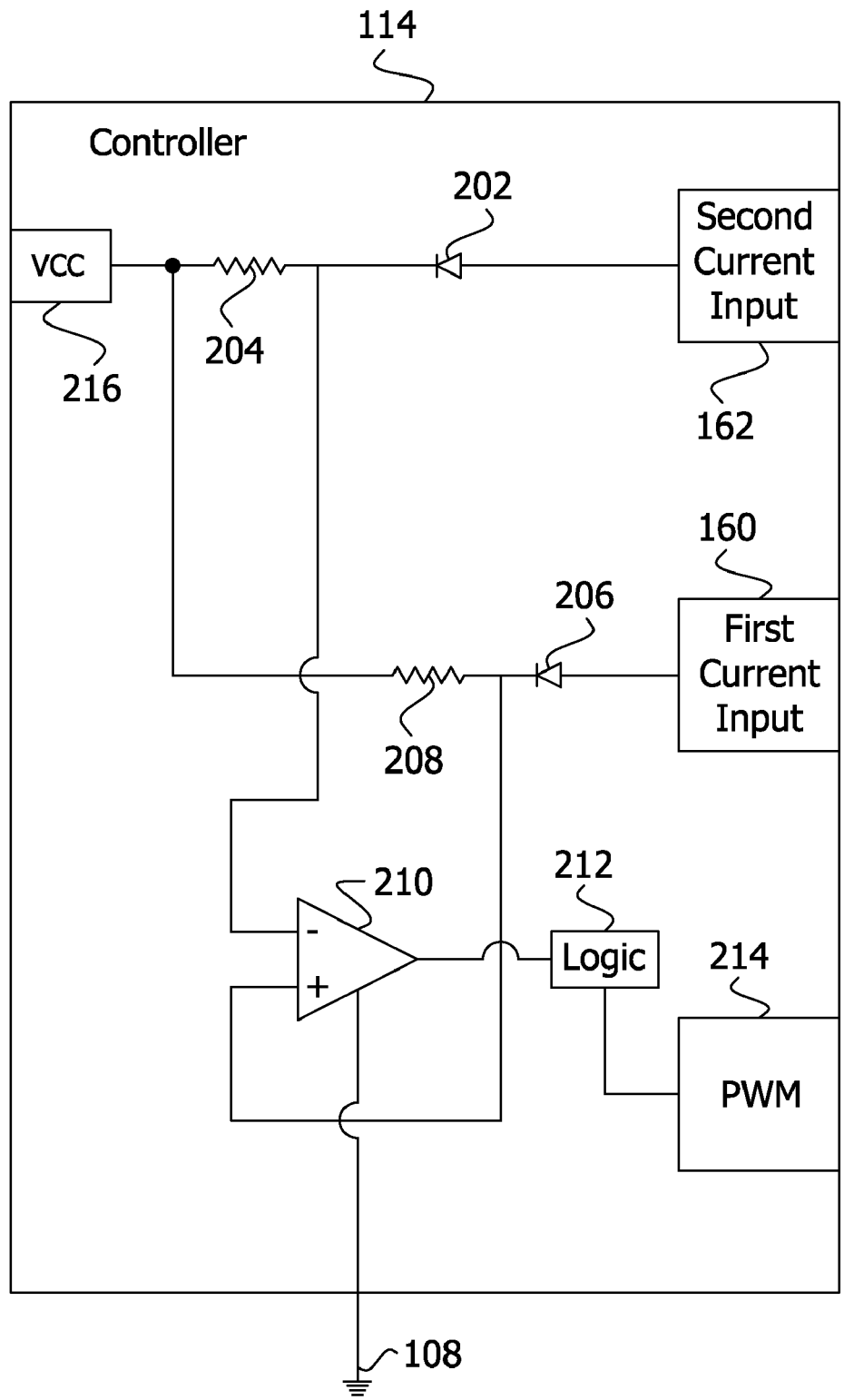
FIG. 2 is a partial schematic diagram of a controller of the electronic ballast of FIG. 1 according to one embodiment of the invention.
Figure 3A:
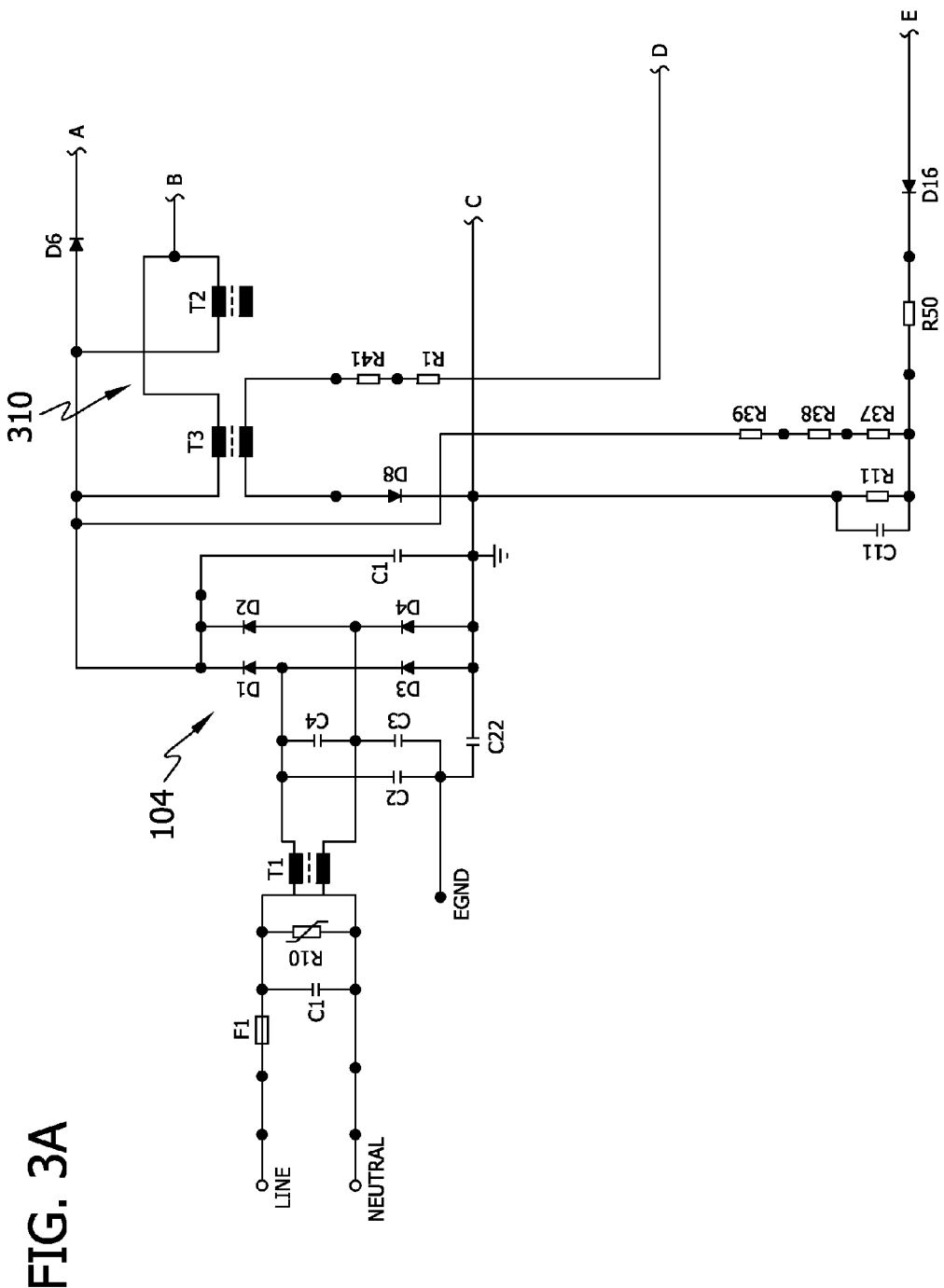
FIG. 3 is a schematic diagram of the ballast of FIG. 1 according to one embodiment of the invention.
Figure 3B:
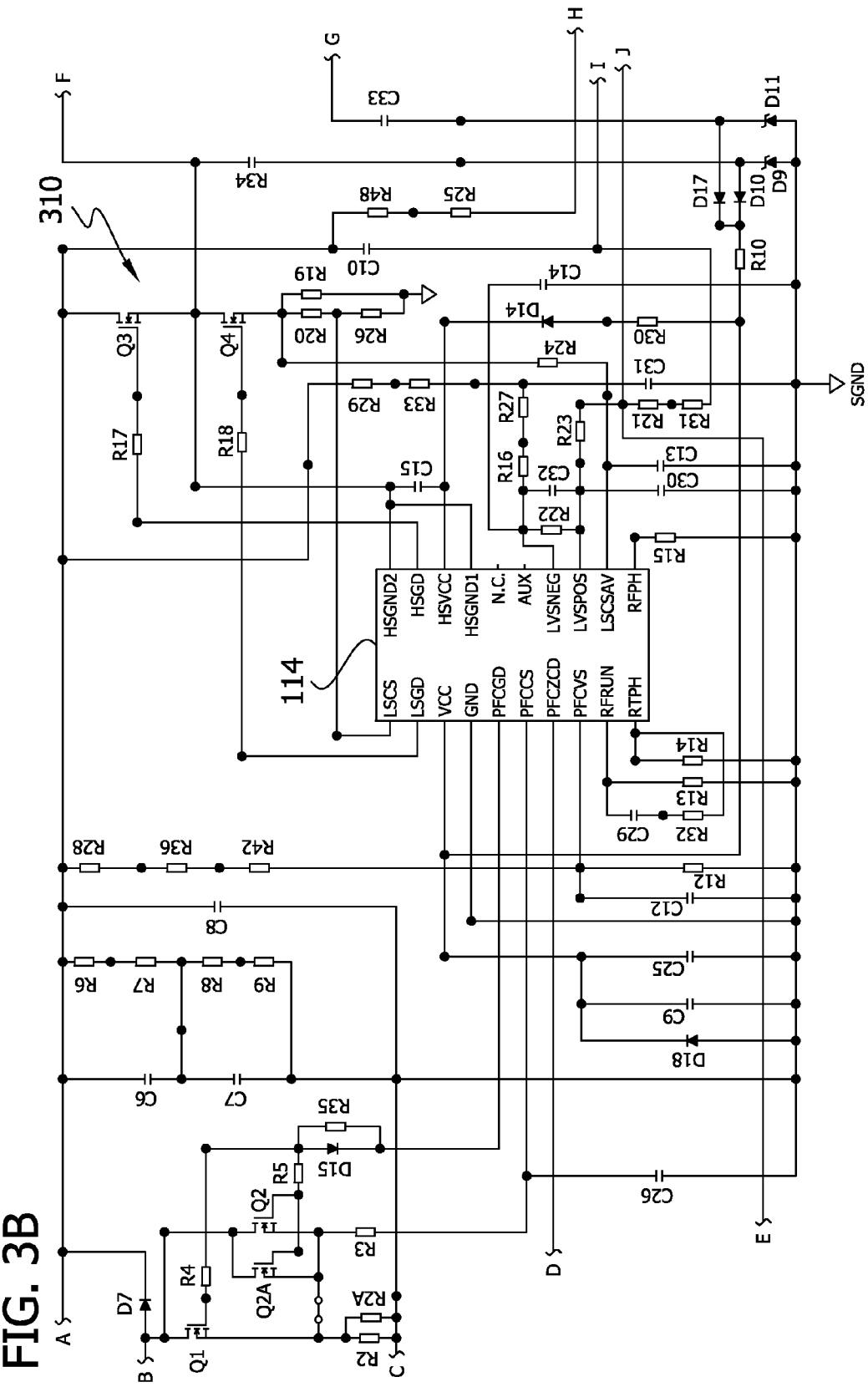

Referring to FIG. 2, the controller 114 of FIGS. 1, 2, and 3B receives the first current at the first current input 160. The anode of a first controller diode 206 is connected to the first current input 160, and the cathode of the first controller diode 206 is connected to a first side a first controller resistor 208. A second side of the first controller resistor 208 is connected to an operating voltage node 216 of the controller 114. The anode of a second controller diode 202 is connected to the second current input 162, and the cathode of the second controller diode 202 is connected to a first side a second controller resistor 204. A second side of the second controller resistor 204 is connected to the operating voltage node 216 of the controller 114. In some embodiments, a capacitor (not shown in FIG. 2) may be connected between the operating voltage node 216 and the ground 108. The controller also includes a comparator 210 having a negative input connected to the cathode of the second controller diode 202 and a positive input connected to the cathode of the first controller diode 206. An output of the comparator 210 is connected to a logic circuit 212 of the controller 114. The logic circuit 212 determines whether to prevent or drive the switching operation of the inverter 110. The logic circuit 212 loads parameters into a pulse width modulation (PWM) unit 214 of the controller 114 for driving or preventing the switching operation of the inverter 110. The PWM unit 214 drives the inverter as a function of the loaded parameters. When the first and second currents are supplied to the controller 114, the operating voltage node 216 develops an operating voltage for the controller 114, and the controller draws an operating current from the node, enabling start up of the electronic ballast 100. In some embodiments, the controller may be an OS2331418 or ICB2FLOSRAM available from Infineon Technologies, AG of Neubiberg, Germany. The controller 114 also analyzes the first current and the second current to determine other lamp problems, such as but not limited to end of lamp life and rectifier effect.

Referring again to FIG. 1, the dv/dt circuit 116 reduces the first current for a transient time period in response to replacement of the first lamp L1 or the second lamp L2. The dv/dt circuit 116 comprises a first resistor R44, a second resistor R46, a first capacitor C28, a third resistor R45, a second capacitor C27, and a switch Q5. The first resistor R44 is connected between the first terminal 156 of the third output pair 123 and the first terminal 152 of the second output pair 122. The second resistor R46 has a high side connected to the second terminal 142 of the second output pair 122 and a low side connected to the ground 108. The first capacitor C28 has an input side connected to the high side of the second resistor R46. The output side of the first capacitor C28 is connected to a high side of third resistor R45, and a low side of the third resistor R45 is connected to the ground 108. The second capacitor C27 is connected in parallel with the third resistor R45. The switch Q5 has an input connected to the output side of the first capacitor C28, a low side connected to the ground 108, and a high side connected to the first current input 160 of the controller 114. In the electronic ballast 100 shown in FIG. 1, the dv/dt circuit 116 also includes, and in some embodiments may optionally include, a second capacitor C27 connected in parallel with the third resistor R45, a first diode D12 connected in parallel with the third resistor R45 with its anode connected to the ground 108, a second diode D13 connected in parallel with the second resistor R46 with its anode connected to the ground 108, and a third capacitor C33 connected in parallel with the second resistor R46. Also in the electronic ballast 100 shown in FIG. 1, the input side of the first capacitor C28 is connected to the first terminal 142 of the second output pair 122 via a fourth resistor R47, and the high side of the switch Q5 is connected to the first current input 160 via a fifth resistor R34.

In operation, the dv/dt circuit 116 monitors a voltage of the second output pair 122 connected to the second terminal 142 of the first lamp L1 for a rapid voltage change. Such a rapid voltage change activates a switch Q5 when a voltage change with respect to time exceeds a threshold. The time that the switch remains activated (i.e., the transient time period) is a function of the values of the resistors and capacitors that form the dv/dt circuit 116 and the time rate of change of the monitored voltage. In the electronic ballast 100 shown in FIG. 1, the dv/dt circuit activates the switch Q5 when the second filament 132 of the first lamp L1 or the first filament 134 of the second lamp L2 is reconnected to the electronic ballast 100 after a period of being disconnected. The activation of the switch Q5 causes the first current to dip, and the determined ratio of the first current to the second current, as determined by the controller 114, falls below the predetermined ratio. When the transient time period passes, the first current returns to approximately the same level as before activation of the switch Q5, and the determined ratio of the first current to the second current, as determined by the controller 114, now meets or exceeds the predetermined ratio. The controller 114, in response, restarts the electronic ballast 100 by driving the switching operation of the inverter 110.

Figure 3C:
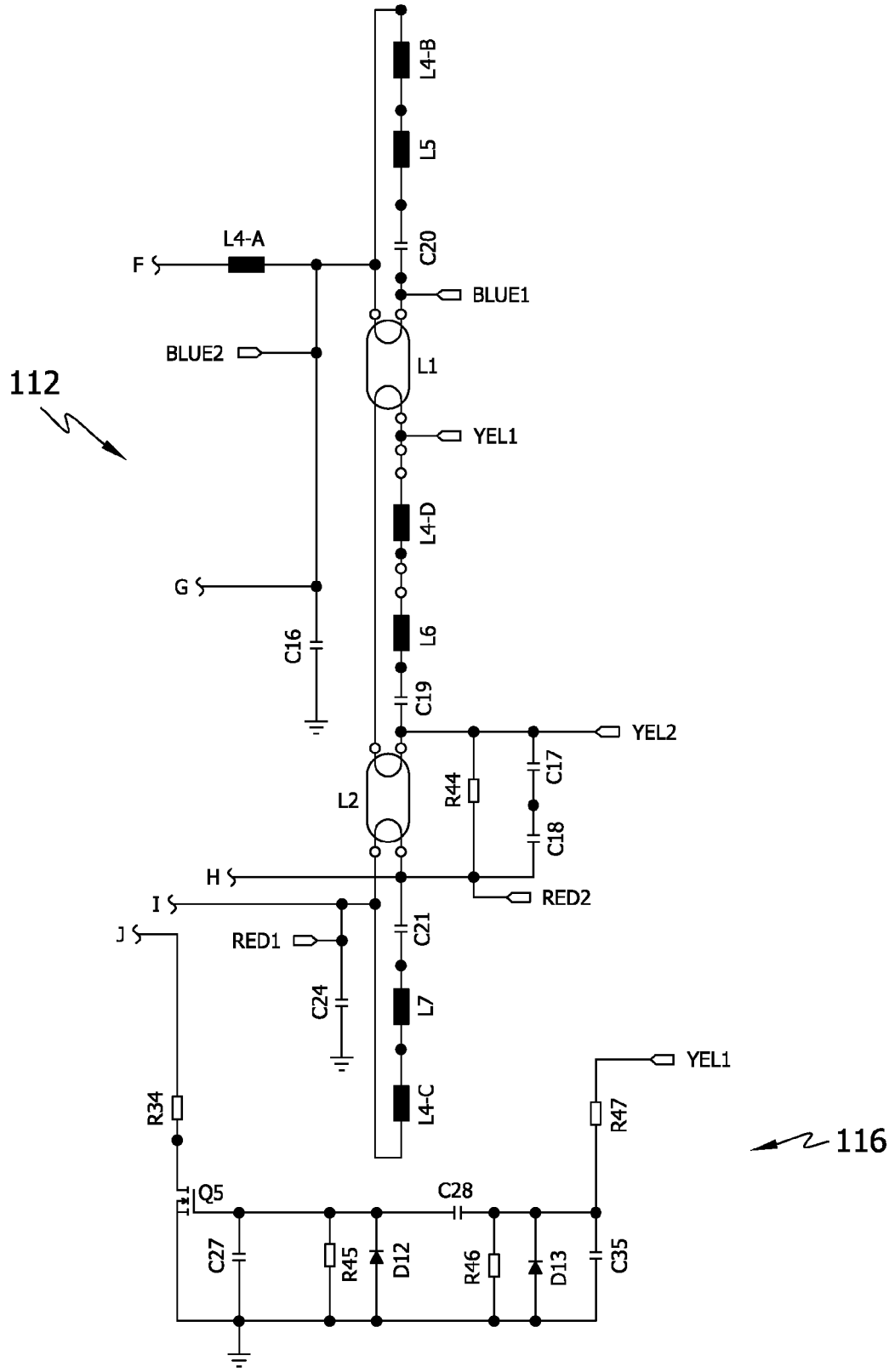

FIGS. 3A, 3B and 3C illustrate in detail an embodiment of a light source that includes the electronic ballast 100 shown in detail in FIG. 1, lamps L1 and L2, and the power supply 102. The light source illustrated by FIGS. 3A, 3B and 3C includes the inverter 110, the rectifier 104, the resonant circuit 112, and various other components of the electronic ballast 100 according to one embodiment of the invention.

In FIG. 3A, transformer T1 steps up the AC line voltage provided by power supply 102 and provides the stepped up voltage to the rectifier 104. The rectifier 104 including diodes D1-D4 provides the rectified voltage to a power factor correction circuit 310, including transformers T2 and T3 and switches Q1, Q2, and Q2A (see FIG. 3B).

In FIG. 3B, the inverter 110 includes switches Q3 and Q4 controlled by the controller 114 to generate the rectified, inverted voltage provided to the resonant circuit 112.

In FIG. 3C, the resonant circuit 112 is illustrated and includes inductor L4-A and C16 which cooperate with miscellaneous other inductors and capacitors illustrated in FIG. 3C to determine the resonant frequency of the resonant circuit 112. The dv/dt circuit 116 includes resistors R45, R46, and R47, capacitors C27, C28, and C35, diodes D12 and D13, and switch Q5.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

Having described aspects of the invention in detail, it will be apparent that modifications and variations are possible without departing from the scope of aspects of the invention as defined in the appended claims. As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A light source comprising:
   a ballast, wherein the ballast comprises:
      a controller;
      a dv/dt circuit:
      a rectifier configured to receive alternating current power from a power supply and to provide a direct current (DC) voltage to a DC voltage bus;
      an inverter configured to receive power from the DC voltage bus and to provide AC power during execution of a switching operation; and
      a resonant circuit configured to receive the AC power provided by the inverter, said resonant circuit comprising a first output pair, a second output pair, and a third output pair;
   a first lamp having a first filament and a second filament, wherein the first filament is connected across the first output pair;
   a second lamp having a first filament and a second filament, wherein the first filament of the second lamp is connected in series with the second filament of the first lamp across the second output pair, and the second filament of the second lamp is connected across the third output pair;
   wherein the controller is configured to monitor a first current corresponding to a DC current through at least one of the filaments of the lamps and to monitor a second current corresponding to a reference current, said controller further configured to determine a ratio of the first current to the second current, and to control the switching operation of the inverter as a function of the determined ratio, wherein:
      the controller inhibits the switching operation of the inverter when the determined ratio of the first current to the second current is less than a predetermined ratio,
      the controller drives the switching operation of the inverter when the determined ratio is more than the predetermined ratio, and
      the controller restarts the ballast in response to the ratio transitioning from below the predetermined ratio to above the predetermined ratio; and
   wherein the dv/dt circuit is configured to reduce the first current for a transient time period in response to a rapid voltage change at the second output pair;
   wherein the connection of at least one lamp filament to the resonant circuit causes the dv/dt circuit to reduce the first current for the transient time period, resulting in the determined ratio falling below the predetermined ratio for the transient time period.

2. The light source of claim 1 further comprising:
   a filament health check circuit configured to provide the first current to the controller when the second filament of the second lamp is connected to the third output pair and the second filament is conductive.

3. The light source of claim 2 wherein the filament health check circuit comprises a resistance connected between the DC voltage bus and a first terminal of the second filament of the second lamp, wherein the second terminal of the second filament of the second lamp is connected to a first current input of the controller.

4. The light source of claim 3 wherein the first current provides an operating current and voltage for the controller such that the controller starts up the inverter in response to the first current.

5. The light source of claim 3 wherein the dv/dt circuit comprises:
a first resistor connected between the first terminal of the second filament of the second lamp and a first terminal of the first filament of the second lamp, wherein a second terminal of the first filament of the second lamp is connected to a first terminal of the second filament of the first lamp;
a second resistor having a high side connected to a second terminal of the second filament of the first lamp and a low side connected to a ground of the light source;
a first capacitor having an input side and an output side, wherein the input side connected to the high side of the second resistor;
a third resistor connected between the output side of the first capacitor and the ground of the light source;
a second capacitor connected in parallel with the third resistor; and
a switch having an input connected to the output side of the first capacitor, a low side connected to the ground of the light source, and a high side connected to the first current input of the controller.

6. A ballast to power a first lamp and a second lamp, said first lamp having a first filament and a second filament, and said second lamp having a first filament and a second filament, said ballast comprising:
a rectifier configured to receive alternating current power from a power supply and to provide a direct current (DC) voltage to a DC voltage bus;
an inverter configured to receive power from the DC voltage bus and to provide AC power during execution of a switching operation;
a resonant circuit configured to receive the AC power provided by the inverter, said resonant circuit comprising:
a first output pair for connecting across the first filament of the first lamp,
a second output pair for connecting across the second filament of the first lamp and the first filament of the second lamp, wherein the second filament of the first lamp is in series with the first filament of the second lamp, and
a third output pair for connecting across the second filament of the second lamp;
a controller configured to monitor a first current and a second current, wherein the first current is a DC current through at least one of the filaments of the lamps and the second current is a reference current, said controller further configured to determine a ratio of the first current to the second current, and to control the switching operation of the inverter as a function of the determined ratio, wherein:
the controller inhibits the switching operation of the inverter when the determined ratio of the first current to the second current is less than or equal to a predetermined ratio,
the controller drives the switching operation of the inverter when the determined ratio is more than the predetermined ratio, and
the controller restarts the ballast in response to the ratio transitioning from below the predetermined ratio to above the predetermined ratio; and
a dv/dt circuit configured to reduce the first current for a transient time period in response to a rapid voltage change at the second output pair;
wherein the connection of at least one lamp filament to the resonant circuit causes the dv/dt circuit to reduce the first current for the transient time period, resulting in the determined ratio falling below the predetermined ratio for the transient time period.

7. The ballast of claim 6 further comprising:
a filament health check circuit configured to provide the first current to the controller when the second filament of the second lamp is connected to the third output pair and the second filament is conductive.

8. The ballast of claim 7 wherein the filament health check circuit comprises a resistance connected between the DC voltage bus and a first terminal of the third output pair, wherein a second terminal of the third output pair is connected to a first current input of the controller.

9. The ballast of claim 8 wherein the first current provides an operating current and voltage for the controller such that the controller starts up the inverter in response to the first current.

10. The ballast of claim 8 wherein the dv/dt circuit comprises:
a first resistor connected between the first terminal of the third output pair and a first terminal of the second output pair, wherein the first terminal of the second output pair is connected to a second terminal of the second output pair via the second filament of the first lamp and the first filament of the second lamp when the first lamp and the second lamp are connected to the ballast;
a second resistor having a high side connected to the second terminal of the second output pair and a low side connected to a ground of the ballast;
a first capacitor having an input side and an output side, wherein the input side is connected to the high side of the second resistor;
a third resistor connected between the output side of the first capacitor and the ground of the ballast;
a second capacitor connected in parallel with the third resistor; and
a switch having an input connected to the output side of the first capacitor, a low side connected to the ground of the ballast, and a high side connected to the first current input of the controller.

11. A method of restarting a ballast that is powering a first lamp and a second lamp, in response to replacement of either lamp, each of said lamps having a first filament and a second filament, said method comprising:
monitoring a first current and a second current, wherein the first current is a direct current (DC) current through at least one of the filaments of the lamps and the second current is a reference current;
determining a ratio of the first current to the second current;
controlling a switching operation of an inverter of the ballast via a controller of the ballast as a function of the determined current ratio, said controlling comprising:
inhibiting the switching operation of the inverter when the determined ratio is less than or equal to a predetermined ratio; and
driving the switching operation of the inverter when the determined ratio is higher than the predetermined ratio;
reducing the first current for a transient time period in response to a rapid voltage change at the second filament of the first lamp, wherein the determined ratio falls below the predetermined ratio for the transient time period due to the reduction of the first current; and
restarting the ballast in response to the determined ratio falling below the predetermined ratio and subsequently increasing to at least the predetermined ratio.

12. The method of claim 11 wherein reducing comprises:
reducing the first current for a transient time period in response to a rapid voltage change at the second filament of the first lamp, wherein the rapid voltage change is caused by the connection of at least one lamp filament to a resonant circuit of the ballast, and wherein the determined ratio falls below the predetermined ratio for the transient time period due to the reduction of the first current.

13. The method of claim 12 further comprising:
receiving alternating current power from a power supply and providing a direct current (DC) power on a DC bus;
receiving the DC power from the DC bus and, in response, providing AC power during a switching operation of the inverter of the ballast; and
receiving the AC power provided by the inverter at the resonant circuit of the ballast, said resonant circuit comprising a first output pair, a second output pair, and a third output pair, wherein the first filament of the first output pair is connected across the first output pair, the first filament of the second lamp is connected in series with the second filament of the first lamp across the second output pair, and the second filament of the second lamp is connected across the third output pair;
wherein controlling the switching operation of the inverter and restarting the ballast are performed by a controller of the ballast;
and wherein reducing the first current for a transient time period is performed by a dv/dt circuit of the ballast.

14. The method of claim 13 further comprising:
providing the first current to the controller when the second filament of the second lamp is connected to the third output pair and the second filament is conductive, wherein providing is performed by a filament health check circuit of the ballast.

15. The method of claim 14 wherein providing comprises:
providing, via the first current, an operating current and an operating voltage for the controller, wherein the controller starts up the inverter in response to receiving the provided first current.

* * * * *